United States Patent
Kimura et al.

(10) Patent No.: US 7,230,356 B2
(45) Date of Patent: Jun. 12, 2007

(54) BRUSHLESS SYNCHRONOUS MOTOR

(75) Inventors: Kiyoshi Kimura, Obu (JP); Taku Itoh, Chita-gun (JP); Shigeru Yoshiyama, Kariya (JP)

(73) Assignee: DENSO Corporation (JP)

( * ) Notice: Subject to any disclaimer, the term of this patent is extended or adjusted under 35 U.S.C. 154(b) by 134 days.

(21) Appl. No.: 11/092,700

(22) Filed: Mar. 30, 2005

(65) Prior Publication Data

US 2005/0218861 A1    Oct. 6, 2005

(30) Foreign Application Priority Data

Mar. 31, 2004    (JP) .............................. 2004-106463

(51) Int. Cl.
*H02K 21/12*    (2006.01)
*F16H 61/32*    (2006.01)

(52) U.S. Cl. ...................... 310/68 B; 310/71; 310/254; 310/DIG. 6

(58) Field of Classification Search .............. 310/68 B, 310/DIG. 6
See application file for complete search history.

(56) References Cited

U.S. PATENT DOCUMENTS

| | | | | |
|---|---|---|---|---|
| 4,096,625 A | * | 6/1978 | Morreale | 29/596 |
| 5,532,533 A | * | 7/1996 | Mizutani | 310/68 B |
| 5,793,132 A | * | 8/1998 | Hirose et al. | 310/71 |
| 5,852,335 A | * | 12/1998 | Suzuki et al. | 310/254 |
| 5,895,994 A | * | 4/1999 | Molnar et al. | 310/215 |
| 6,153,957 A | * | 11/2000 | Takano | 310/71 |
| 6,577,030 B2 | * | 6/2003 | Tominaga et al. | 310/68 B |
| 6,737,771 B2 | * | 5/2004 | Fujita et al. | 310/68 B |
| 6,936,942 B1 | * | 8/2005 | Okazaki et al. | 310/71 |
| 2003/0227287 A1 | * | 12/2003 | Hori et al. | 324/207.25 |
| 2004/0007935 A1 | * | 1/2004 | Kimura et al. | 310/254 |
| 2004/0212261 A1 | * | 10/2004 | Uchiyama | 310/68 B |
| 2005/0206254 A1 | * | 9/2005 | Tsuge et al. | 310/68 B |

FOREIGN PATENT DOCUMENTS

| | | | |
|---|---|---|---|
| JP | 03145949 A | * | 6/1991 |
| JP | A-2004-48908 | | 2/2004 |
| JP | A-2004-52928 | | 2/2004 |

* cited by examiner

*Primary Examiner*—Burton Mullins
(74) *Attorney, Agent, or Firm*—Nixon & Vanderhye PC (57) ABSTRACT

A brushless synchronous motor includes a stator having a plurality of phase coils, a rotor disposed opposite the stator, a magnetic sensor for detecting a rotation angle of the rotor, a power supply circuit connected to the phase coils, a control circuit for controlling the power supply circuit so that the motor rotates synchronously. In the above motor, a circuit board includes a wiring circuit connecting the phase coils with the power supply circuit, and the magnetic sensor is directly fixed to the circuit board so that dimensional variation of the magnetic sensor relative to the stator can be minimized.

10 Claims, 12 Drawing Sheets

BRUSHLESS SYNCHRONOUS MOTOR

CROSS REFERENCE TO RELATED APPLICATION

The present application is based on and claims priority from Japanese Patent Application 2004-106463, filed Mar. 31, 2004, the contents of which are incorporated herein by reference.

BACKGROUND OF THE INVENTION

1. Field of the Invention

The present invention relates to a brushless synchronous motor that changes current supply to a plurality of phase-coils based on the rotation angle of a rotor detected by an encoder.

2. Description of the Related Art

In a brushless synchronous motor having a plurality of phase coils, current supply is shifted from one to another of the phase coils according to the rotation angle. The rotation angle is detected by an encoder that is composed of a rotor on which a permanent magnet is mounted and a magnetic sensor element such as a hall IC element fixed on a circuit board. Such a magnetic sensor element detects magnetic flux provided by the permanent magnet, as disclosed in JP-A-2004-48908 or U.S. 2004/0007935 A1, a counterpart of the former.

In order to make the brushless motor synchronous, the position of rotor teeth relative to stator teeth has to be detected at a high accuracy. Therefore, it is necessary to locate the magnetic sensor accurately relative to the stator. This is rather difficult because there are a lot of parts between the magnetic sensor and the stator, such as a circuit board, terminals and bobbins, which usually give dimensional variations. For instance, the magnetic sensor is fixed to the circuit board, and the stator core is fixed to a stator housing via the terminals and the bobbins.

The stator terminals are insert-molded into the stator housing. Those of the stator terminals on the side of the stator bobbins are located annularly along the stator winding to extend in the axial direction of the stator housing. Therefore, great care is necessary when the bobbins are assembled into the stator housing without damage of the stator terminals.

SUMMARY OF THE INVENTION

Therefore, an object of the present invention is to provide an accurate brushless synchronous motor that is free from the above problem.

Another object of the invention is to provide an inexpensive brushless synchronous motor that can be manufactured at a high productivity.

According to a feature of the invention, a brushless synchronous motor includes a stator having a plurality of phase coils wound around its stator teeth, a rotor disposed opposite the stator, an encoder that includes a permanent magnet fixed to the rotor, a magnetic sensor and a circuit board fixed to the stator, a power supply means for supplying electric power to the phase coils, a control means for controlling the power supply means to change power supply to one of the phase coils from another based on the rotor's rotation angle. In the above structure, the circuit board includes a wiring circuit that connects the phase coils with the power supply means, and the magnetic sensor is directly fixed to the circuit board.

Thus, only the circuit board and the phase coils intervene between the magnetic sensor and the stator core, so that dimensional variation can be effectively limited.

According to another feature of the invention, the above described brushless synchronous motor may further include a plurality of bobbins each of which is mounted on one of the teeth to support one of the phase coils. Each of the bobbins may have a pair of coil terminals that electrically connects one of the phase coils to the wiring circuit.

The brushless synchronous motor as described above may further include a resinous member, a plurality of stator terminals that connect the wiring circuit with the power supply means and a plurality of sensor terminals that connects the magnetic sensor with the control means. In this motor the sensor terminals and stator terminals are made of bridged metal plates whose bridged portions are cut after being formed into the resinous member.

This brushless synchronous motor may further include a housing made of resinous material which includes the resinous member, a metal ring that has an inner surface supporting the stator and a center hole supporting the rotor. The center hole is preferably machined based a portion of the stator, thereby providing a smaller air gap between the stator and the rotor, which increases output power of the motor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A brushless synchronous motor according to a preferred embodiment of the present invention will be described with reference to FIGS. 1–15.

Figure 3:
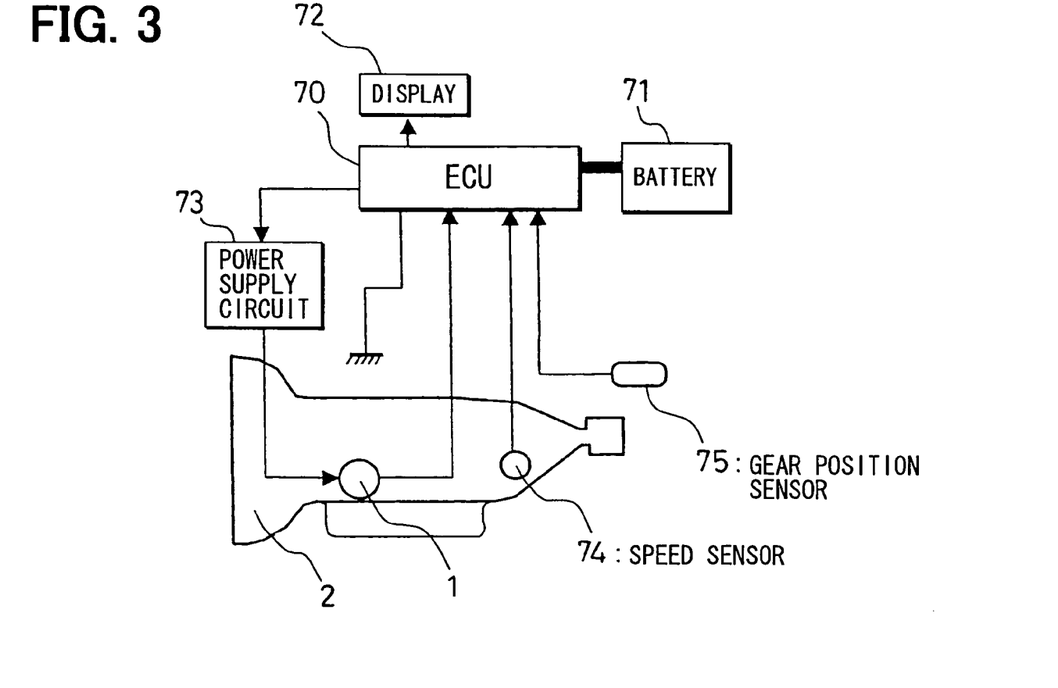
FIG. 3 is a schematic diagram illustrating a shift range changing system in which the rotary actuator according to the invention is mounted.
Figure 4:
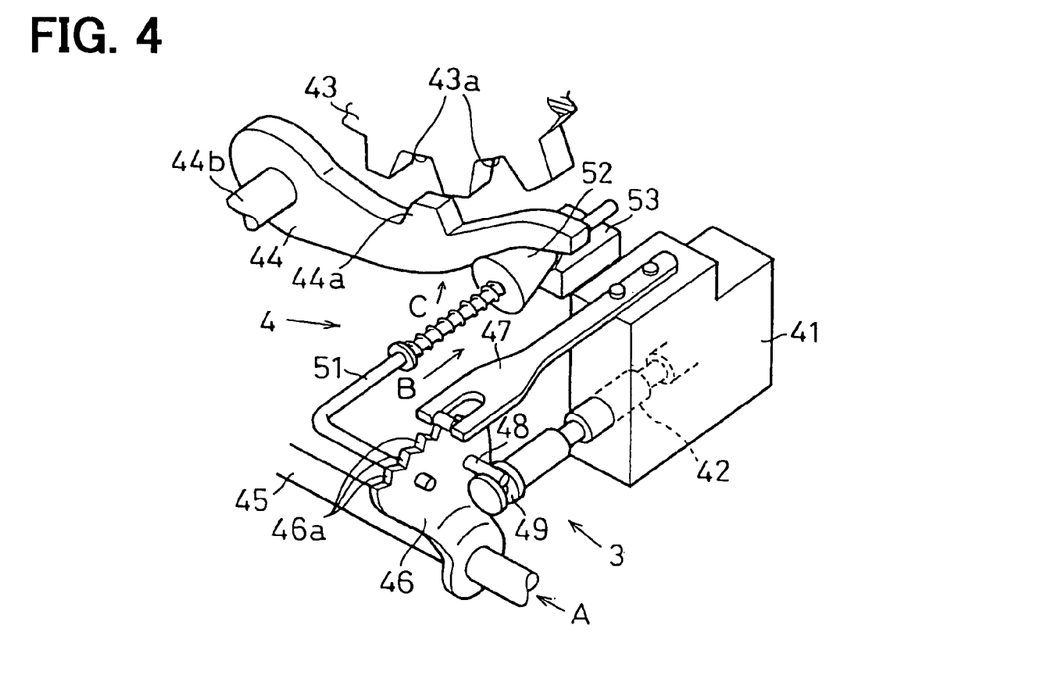
FIG. 4 is a perspective view of the shift range changing system.

Such a brushless motor is applied to a gear shift range changing system. The shift range changing system includes a rotary actuator 1 shown in FIG. 2, an automatic transmission unit 2 shown in FIG. 3 and a shift range changing unit 3, which includes a parking mechanism 4, as shown in FIG. 4.

The rotary actuator 1 operates the shift range changing unit 3. The rotary actuator 1 includes a brushless synchronous motor 5, a speed reduction unit 6 and an encoder 60. The brushless synchronous motor 5 is a switched reluctance motor (SR motor) that is not equipped with a permanent magnet.

The motor 5 includes a rotor 11 and a stator 12, which is disposed to be coaxial with the rotor 11. The rotor 5 includes a rotary shaft 13 and a rotor core 14. The rotary shaft 13 is supported by a pair of roller bearings 15, 16 at the front (right in FIG. 2) and rear (left in FIG. 2) ends thereof.

The speed reduction unit 6 has an output shaft 17, and the front bearing 15 is fitted to the center hole of the output shaft 17. The output shaft 17 is rotatably supported by a metal bearing 19, which is fixed to the inner periphery of a front housing 18. That is, the front end of the rotary shaft 13 is supported by the front housing 18 via the metal bearing 19, which is supported by the output shaft 17 via the roller bearing 15. The metal bearing 19 is located to overlap the front roller bearing 15 in the axial direction, so that the rotary shaft 13 can be prevented from bending due to the reaction force of the speed reduction unit 6, which may be caused when a sun gear 26 engages with a ring gear 27. The rear roller bearing 16 is press-fitted to the rear end of the rotary shaft 13 and supported by the rear housing 20.

Figure 5:
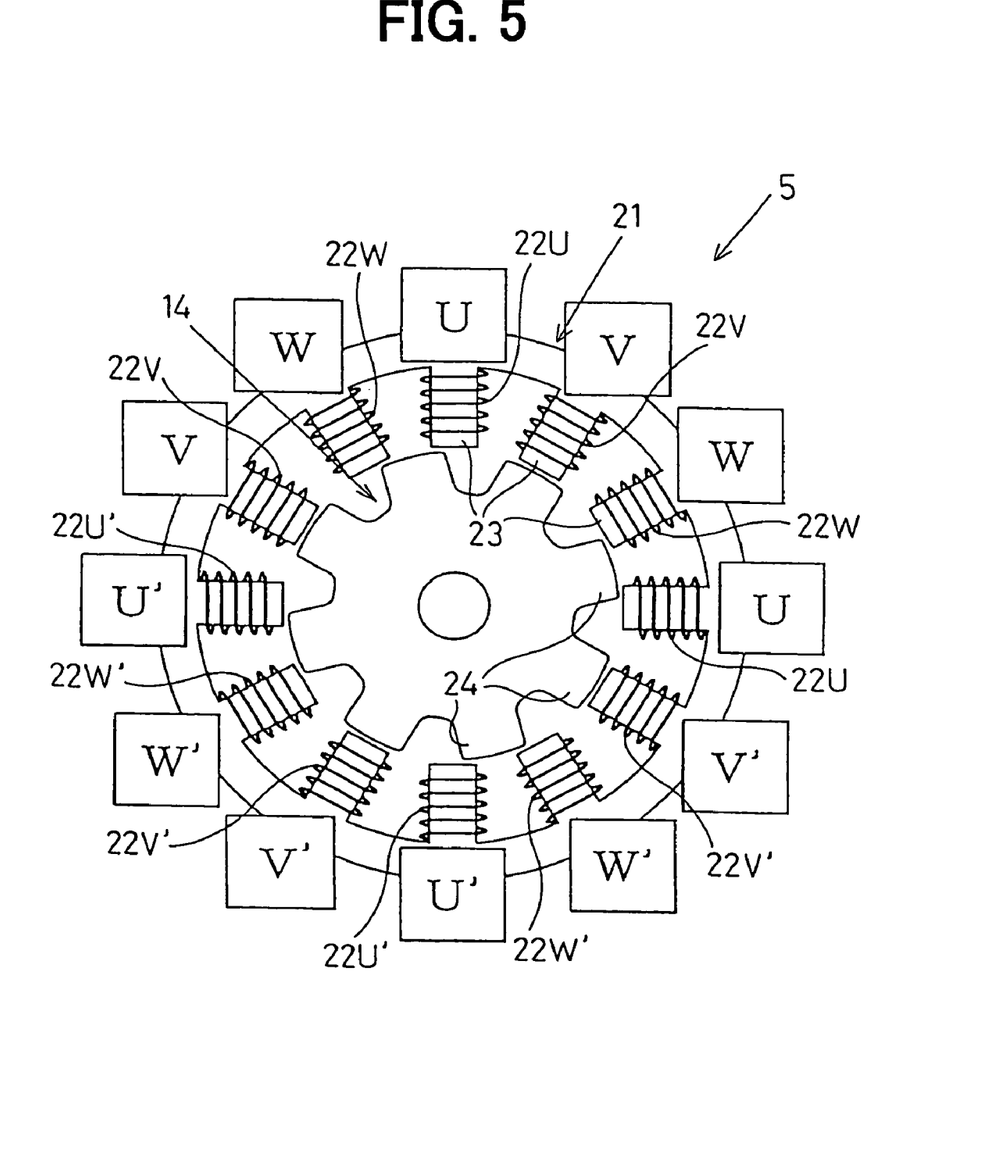
FIG. 5 is a schematic diagram of a brushless synchronous motor.

The stator 12 includes a stator core 21 and a plurality of phase coils 22 (i.e. 22U, 22U', 22V, 22V', 22W, and 22W'), as shown in FIG. 5. The phase coils 22U, 22U' correspond to phase U, the phase coils 22V, 22V' correspond to phase V, and the phase coils 22W, 22W' correspond to phase W. The stator core 21 is a laminar member of thin plates of magnetic material, which is fixed to the rear housing 20. The stator core 21 has twelve stator teeth 23 that project radially inward at intervals of 30 degrees in mechanical angle. Each of the phase coils 22 is wound around one of the stator teeth 23.

The rotor core 14 is a laminar member of thin plates of magnetic material, which is force-fitted to the rotary shaft at the center thereof. The rotor core 14 has eight rotor teeth 24 that project radially outward at intervals of 45 degrees in mechanical angle.

When electric power supply is changed from the U-phase coils to the V-phase coils and from the V-phase coils to the W-phase coils, the rotor 11 rotates clockwise by 45 degrees in mechanical angle. On the other hand, the rotor rotates counterclockwise by 45 degrees in mechanical angle when electric power supply is changed from the W-phase coils to the V-phase coils and from the V-phase coils to the U-phase coils.

Figure 6:
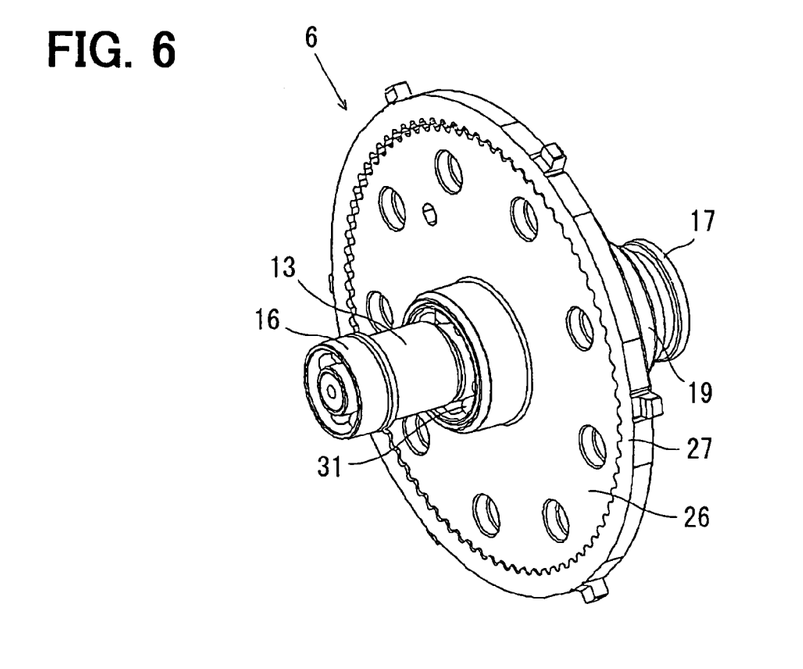
FIG. 6 is a perspective rear view of a speed reduction unit.
Figure 7:
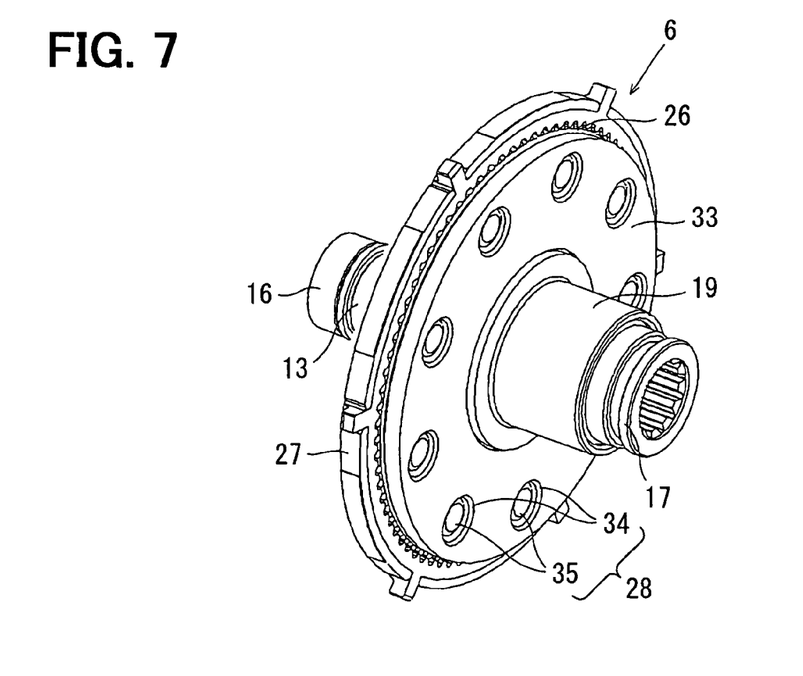
FIG. 7 is a perspective front view of the speed reduction unit.
Figure 8:
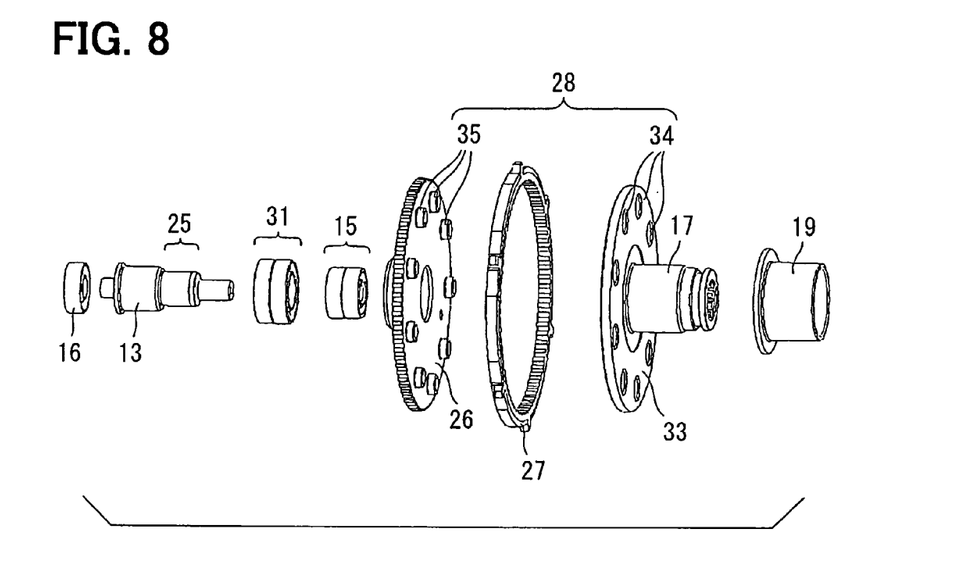
FIG. 8 is a perspective exploded view of the speed reduction unit.

The speed reduction unit 6 has a planetary gear type or a cycloid type speed reduction mechanism, as shown in FIGS. 6–8.

The speed reduction unit 6 includes an eccentric portion 25 of the rotary shaft 13, a sun gear or an inner gear 26, a ring gear or an outer gear 27 and a carrier member 28. The sun gear 26 is rotatably supported by the eccentric portion 25 via a bearing 31 to rotate eccentrically relative to the center axis of the rotary shaft and is in mesh with the ring gear 27, which is fixed to the front housing 18 shown in FIG. 2. The carrier member 28 includes a flange 33 that has a plurality of inner pin-holes 34 and as many inner pins 35 that project in the axial direction from the front surface of the sun gear 26 as the inner pin holes 34. The flange 33 is fixed to the rear end of the output shaft 17 to rotate together. The carrier member 28 transmits the rotation of the sun gear 26 to the output shaft 17 via the inner pins 35 in engagement with the inner-pin holes 34.

When the rotary shaft 13 rotates, the sun gear 26 rotates about the eccentric portion 25 at a speed lower than the rotary shaft 13. This rotation is transmitted to the output shaft 17, which is connected to a control rod 45 of the shift range changing unit 3.

Incidentally, the sun gear 26 may have the inner-pin holes 34 instead of the inner pins 35 if the flange 33 has the inner pins 35 instead of the inner-pin holes 34.

The shift range of the automatic transmission unit 2, which usually includes ranges P, R, N, D, is changed when a manual spool valve 42 of an oil pressure control box 41 is operated. Locking or unlocking of the parking mechanism 4 is carried out when a projection 44a of a parking pole 44 engages with or disengages from a recess 43a of a parking gear 43. The parking gear 43 is linked, via a differential gear, with the output shaft of the automatic transmission unit 2. Therefore, vehicle wheels are locked when the parking gear 43 is locked.

A fan shaped detent plate 46 is fixed to the control rod 45 of the shift range changing unit 3 by means of a spring pin or the like. The detent plate 46 has a plurality of recesses 46a at the arc-shaped peripheral portion. A spring plate 47 is fixed to the pressure control box 41 and engages one of the recesses 46a to hold one of the shift ranges. The detent plate 46 has a pin 48 to drive the manual spool valve 42. The pin 48 engages an annular groove 49 formed on the manual spool valve 42. When the detent plate 46 moves as the control rod rotates 45, the pin 48 moves in an arc, so that the manual spool 42 moves straight in the pressure control box 41.

When the control rod 45 rotates clockwise viewed from position A in FIG. 4, the pin 48 pushes the manual spool valve 42 via the detent plate 46 into the inside of the oil pressure control box 41. Therefore, the oil passages in the oil pressure control box 41 are changed in a direction P-R-N-D of the shift range of the automatic transmission unit 2. When the control rod 45 rotates counter-clockwise, the oil passages in the oil pressure control box 41 are changed in the other direction, that is D-N-R-P.

A park rod 51 is also fixed to the detent plate 46 to drive the parking pole 44. The park rod 51 has a conical member 52 at its one end. The conical member 52 is disposed between the parking pole 44 and a projection 53 that projects from the housing of the automatic transmission unit 2.

When the control rod 45 turns clockwise, the park rod 51 is moved by the detent plate 46 in the direction indicated by an arrow B, so that the conical member 52 lifts the parking pole 44. Consequently, the parking pole 44 rotates about its axis 44b in the direction indicated by an arrow C, so that the projection 44a of the parking pole 44 engages the recess 43a of the parking gear 43 to lock the parking mechanism 4.

When the control rod 45 turns counterclockwise, the park rod 51 is moved by the detent plate 46 opposite the direction indicated by an arrow B, so that the parking pole 44 is not lifted by the conical member 52. Consequently, the parking pole 44 is rotated by a coil spring (not shown) about its axis 44b opposite the direction indicated by the arrow C, so that the projection 44a of the parking pole 44 disengages from the recess 43a of the parking gear 43 to unlock the parking mechanism 4.

Figure 1A:
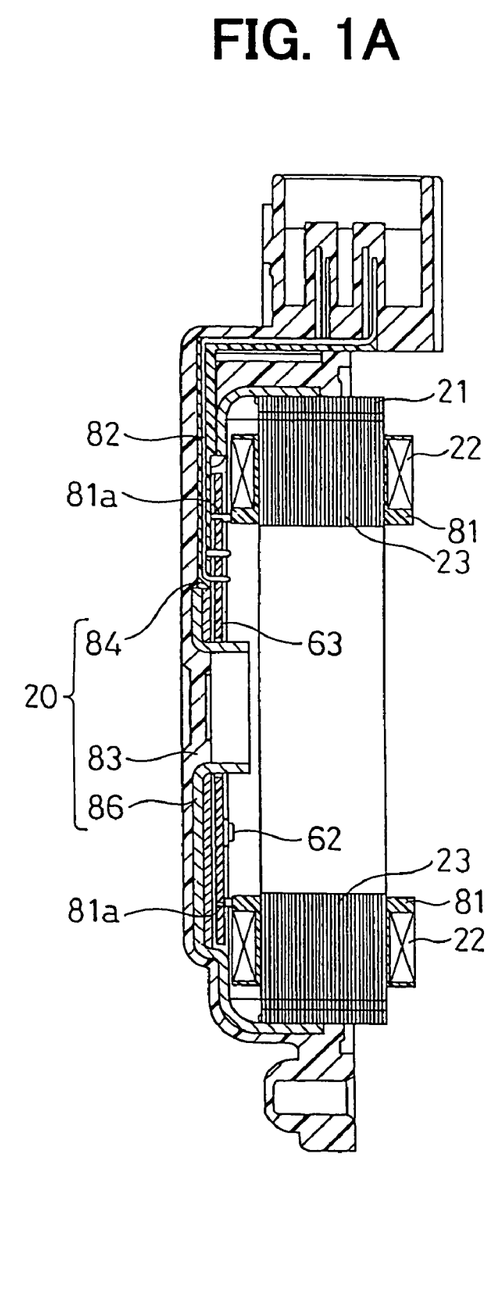
FIG. 1A is a cross-sectional side view illustrating an assembly of a stator housing, a stator and a part of an encoder.
Figure 1B:
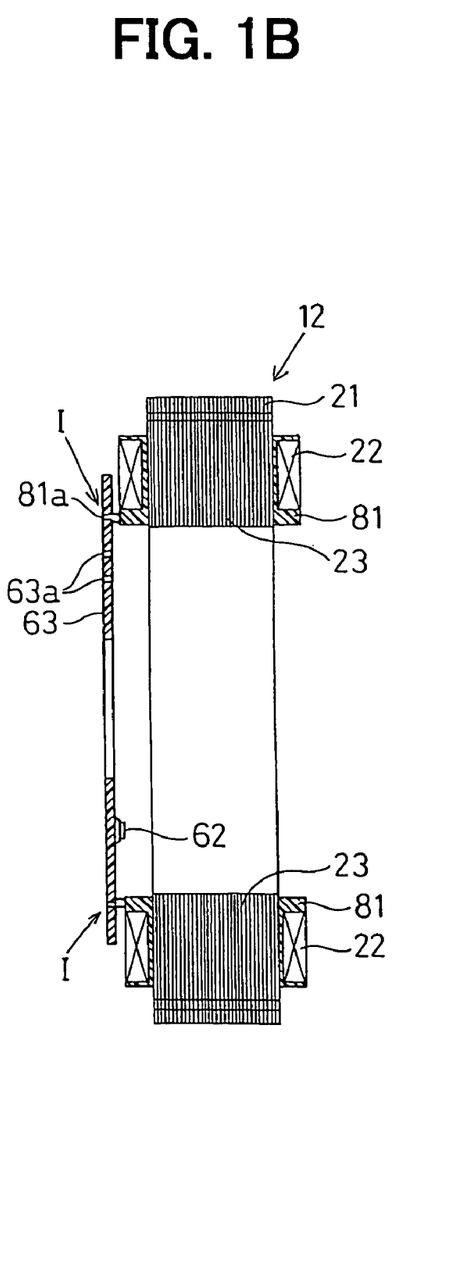
FIG. 1B is a cross-sectional side view of the stator and the part of the encoder before being assembled into the stator housing.
Figure 2:
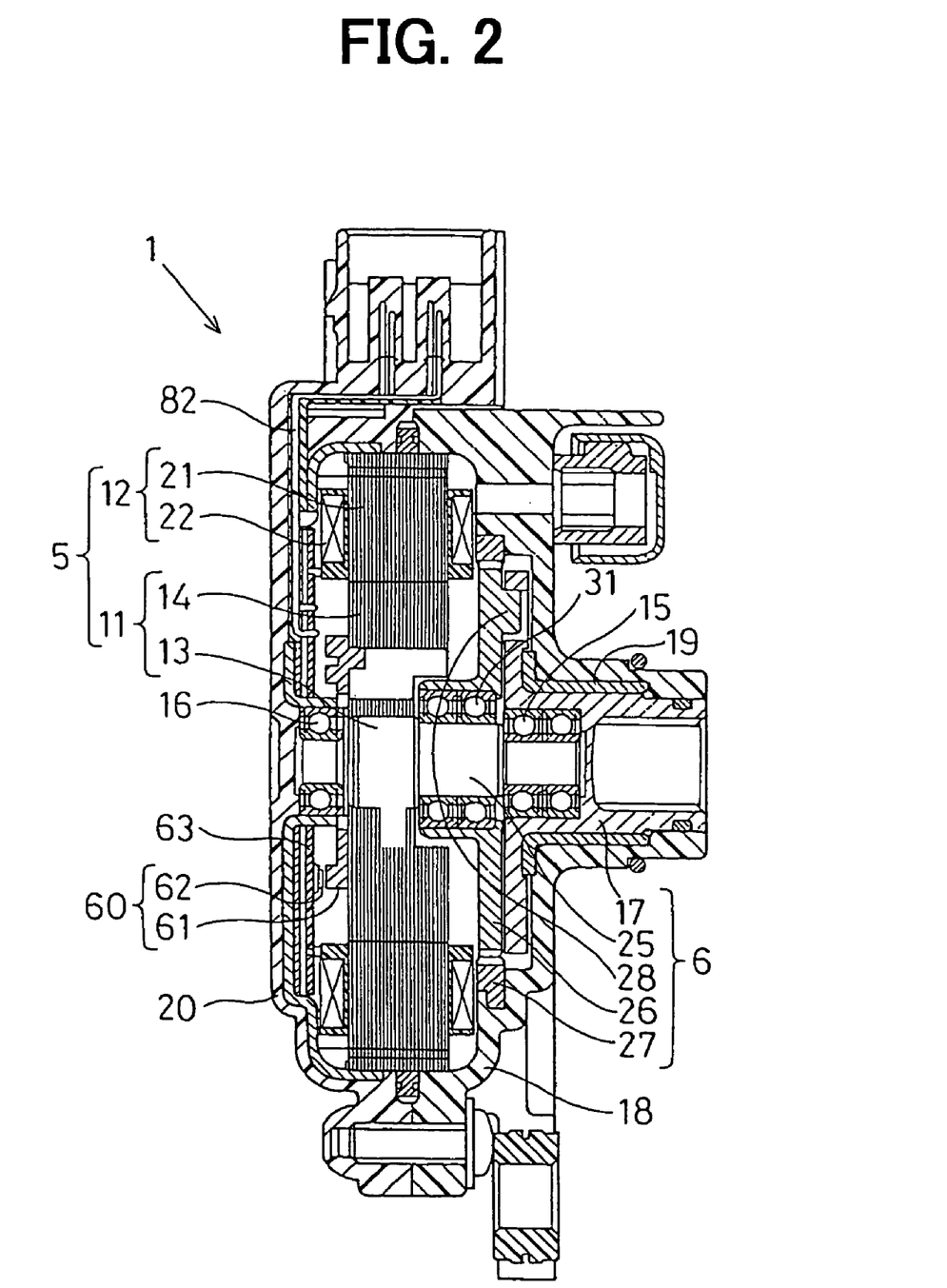
FIG. 2 is a cross-sectional side view illustrating a rotary actuator according to a preferred embodiment of the invention.
Figure 12:
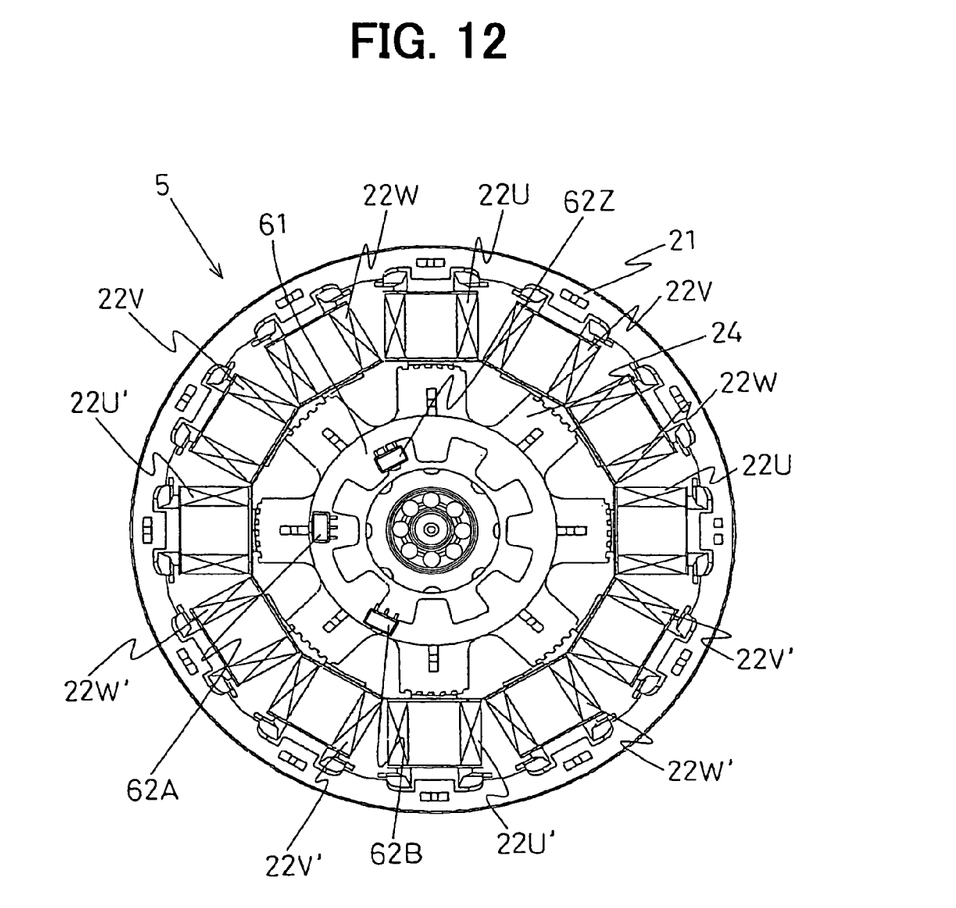
FIG. 12 is a schematic diagram of the brushless synchronous motor with a plurality of hall IC elements disposed thereon.

As shown in FIG. 2, the encoder 60 is disposed within a space defined by the front housing 18 and the rear housing 20. The encoder 60 is an incremental type encoder that includes a permanent magnet 61, a first hall IC 62A, a second hall IC 62B an index hall IC 62Z, as shown in FIG. 12. The permanent magnet 61 is fixed to the rotor 11 so as to rotate together. The hall ICs 62A, 62B, 62Z are represented by reference numeral 62 and held by a circuit board 63, as shown in FIGS. 1A and 1B.

Figure 9A:
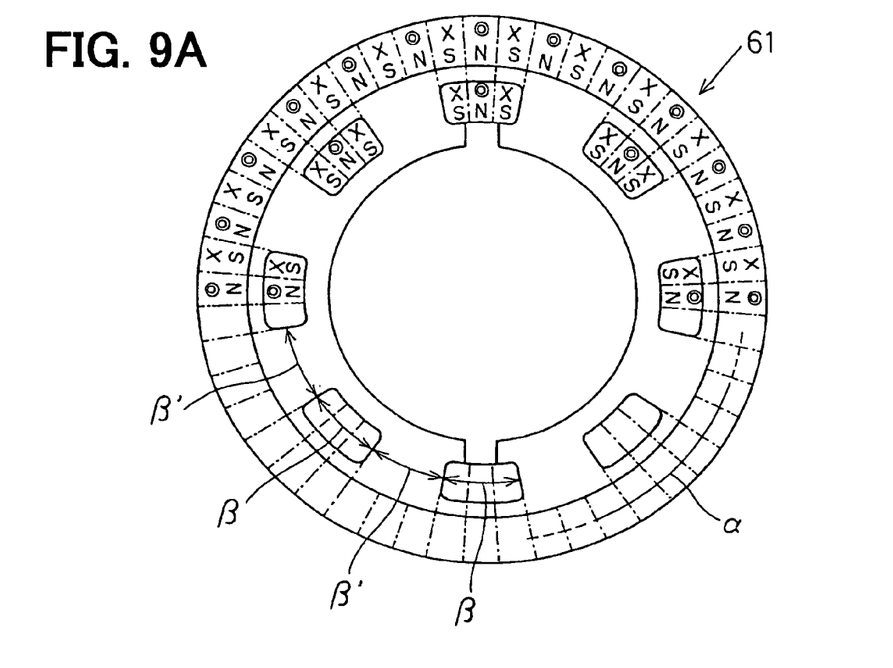
FIG. 9A is a schematic diagram illustrating a permanent magnet that is magnetized.
Figure 9B:
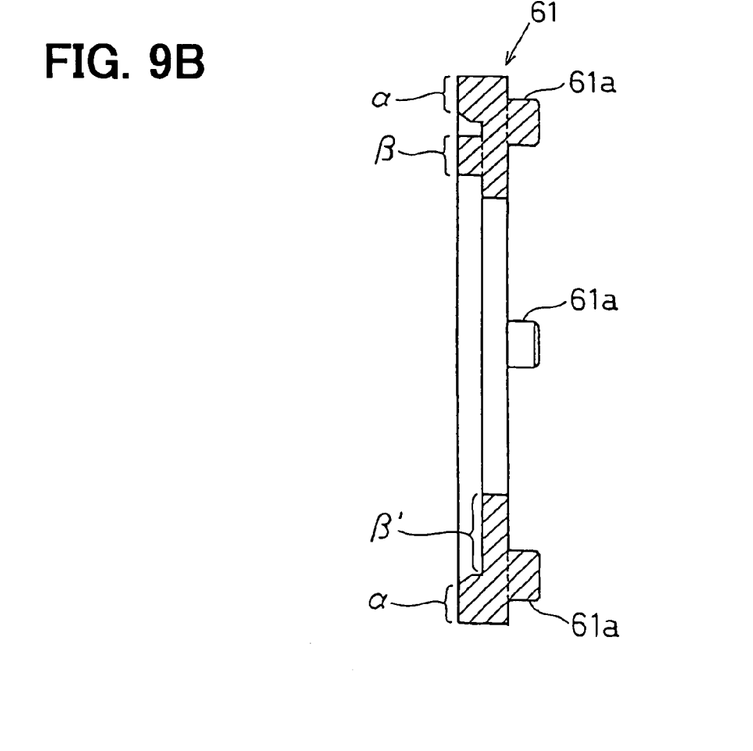
FIG. 9B is a cross-sectional side view of the permanent magnet.

As shown in FIGS. 2, 9A and 9B, the permanent magnet 61 is a ring-shaped member made of neodymium that is fixed to the rear end of the rotor core 14 so as to be coaxial with the rotary shaft 13. A non-magnetic thin film (not shown) may be inserted between the permanent magnet 61 and the rotor core 14 to reduce a magnetic interference in the rotor core 14. The permanent magnet 61 is magnetized to stick to the rotor core 14 by itself. Therefore, it may not necessary to fix the permanent magnet 61 by another fixing member.

Figure 11:
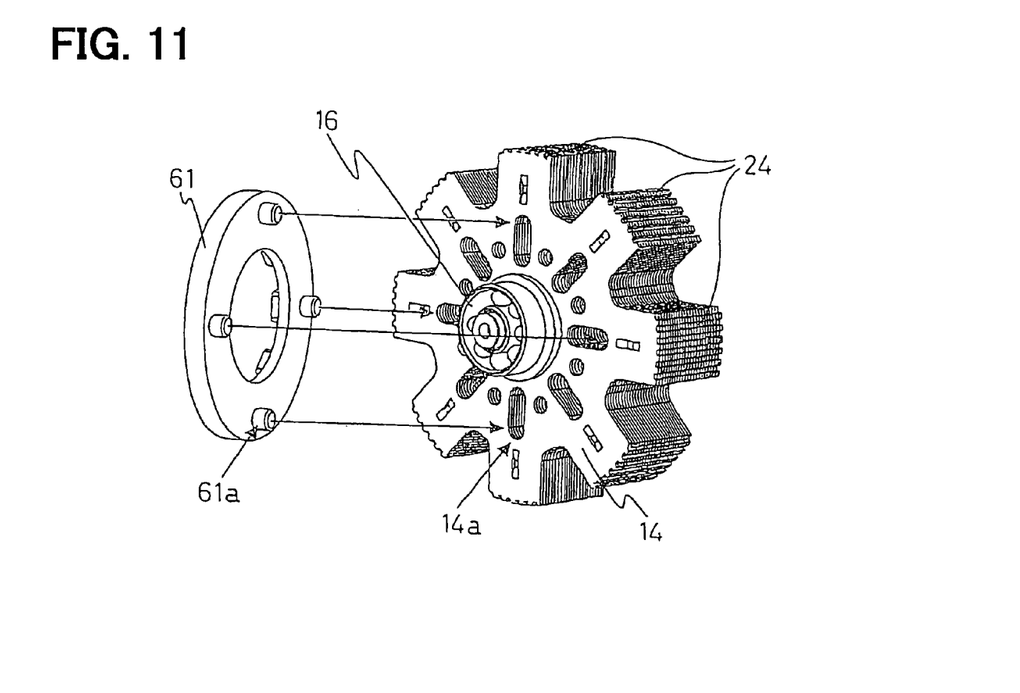
FIG. 11 is a perspective exploded view of the permanent magnet and a rotor core in assembling.

As shown in FIG. 11, a plurality of fixing holes 14a is formed on the rear surface of the rotor core 14, and as many fixing projections 61a as the fixing holes 14a are formed on the front surface of the permanent magnet 61. Therefore, it is easy to assemble the permanent magnet 61 into the rotor core 14.

Figure 10:
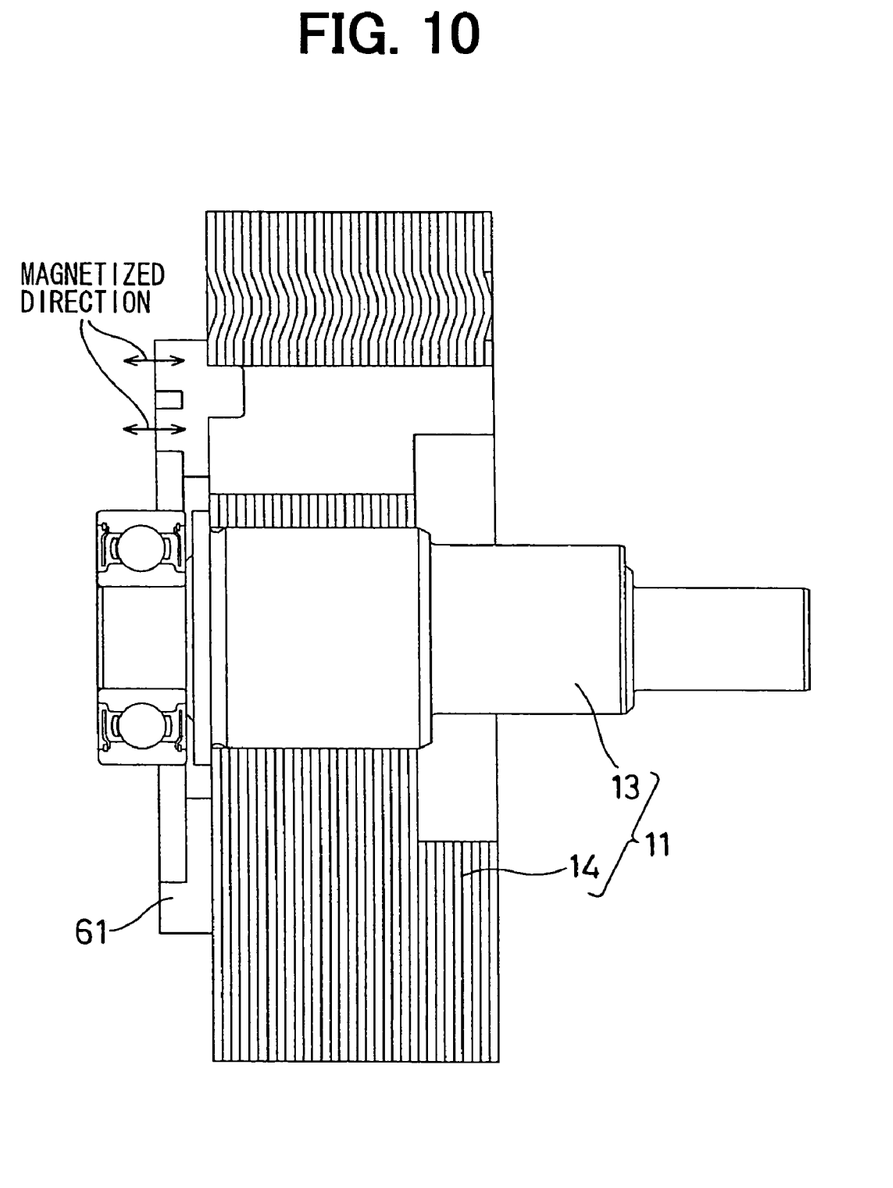
FIG. 10 is a cross-sectional side view of a rotor with the permanent magnet being assembled thereto.

The permanent magnet 61 is fixed to the rotor core 14 and magnetized in the axial direction indicated by arrows in FIG. 10 on the rear surface thereof opposite the hall IC 62 to detect the rotation angle and indexes. The permanent magnet 61 may be magnetized before it is fixed to the rotor core 14. As shown in FIG. 9A, the permanent magnet has a peripheral magnetized zone a having a plurality of magnetic poles on the rear surface thereof, a plurality of arc-shaped magnetized index zones α and arc-shaped non-magnetized index zones β'. which are disposed alternately inside the peripheral magnetized zone α. The peripheral magnetized zone α is to generate the rotation angle signal, and the arc-shaped index zones β, β' are to generate index signals. The permanent magnet 61 the non-magnetized index zones β' are formed to be dented so that the air gap between the non-magnetized index zones and the index hall IC 62Z can be larger than other air gaps, as shown in FIG. 9B. In other words, the peripheral magnetized zone α and index zones β are formed to project from others as lands, so that only the lands are magnetized.

The peripheral magnetized zone α is magnetized to form N and S magnetic poles alternately at intervals of 7.5 degrees in mechanical angle, so as to totally provide 48 magnetic poles. The peripheral magnetized zone α generates rotation signals (hereinafter referred to as the A-phase signal and the B-phase signal).

Each index zone β is magnetized to form N magnetic pole at the middle thereof and S magnetic poles at opposite sides thereof, at intervals of 7.5 degrees in mechanical angle. The index zones β generate the index signal (hereinafter referred to as the Z-phase signal) each cycle (at intervals of 45 degrees in mechanical angle) in which all the U, V and W phase coils 22 are excited. The magnetic poles of the magnetized index zones β are formed to correspond to the magnetic poles of the peripheral magnetized zone α in the circumferential direction, in this embodiment. However, they can be formed not to correspond to each other. The S magnetic poles of the magnetized index zones β may be formed to partially overlap with the N magnetic poles of the peripheral magnetized zone α in the circumferential direction.

The non-magnetized index zones β' are formed between the magnetized index zones β in the circumferential or rotation direction to generate no signal.

Figure 13A:
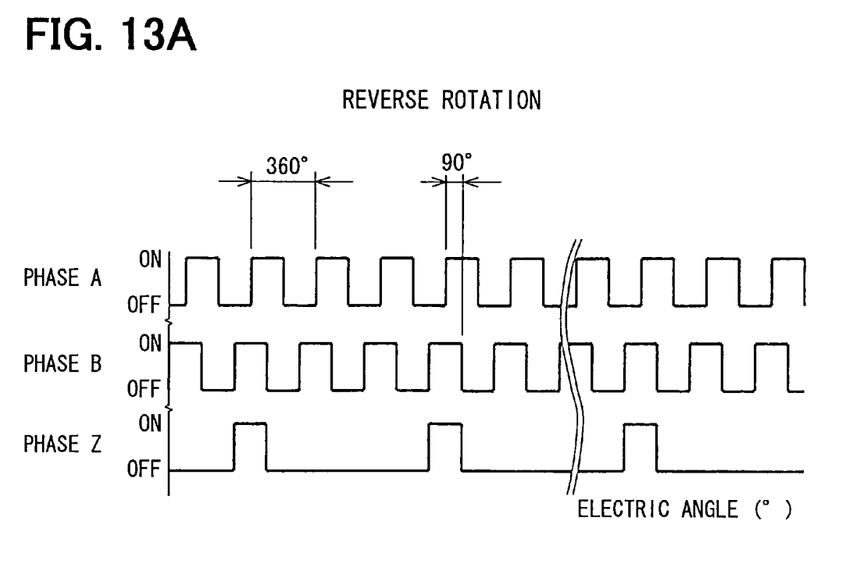
FIGS. 13A and 13B are graphs showing wave shapes of phase signals of phase A, B and Z.
Figure 13B:
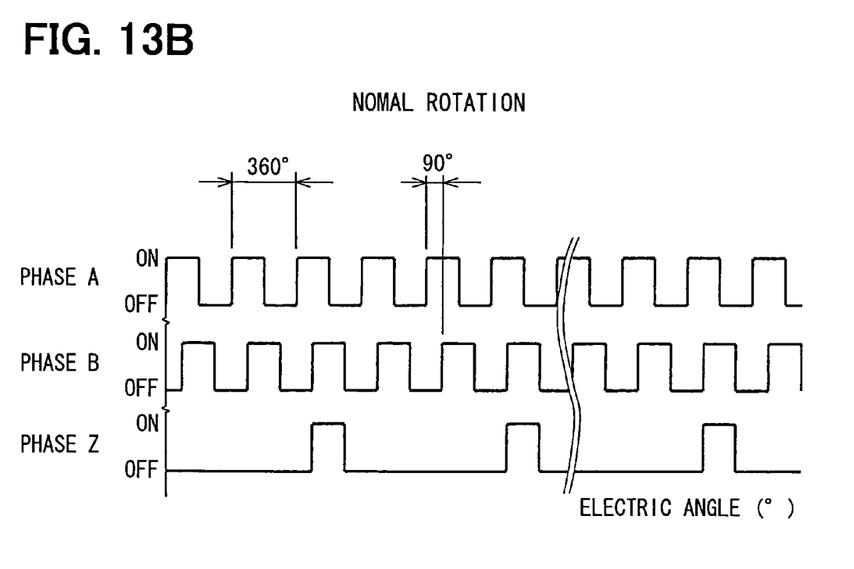

The first hall IC 62A and the second hall IC 62B are supported by the circuit 63 to face the peripheral magnetized zone α in the axial direction. The index hall IC 62Z is supported by the circuit board 63 to face the magnetized index zones β and the non-magnetized index zones β'. The first hall IC 62A and the second hall IC 62B are shifted from each other at an interval of 3.75 degrees in mechanical angle (90 degrees in electric angle) so that the A-phase signal can be shifted from the B-phase signal by 90 degrees in electric angle, as shown in FIGS. 13A and 13B. The first hall IC 62A, the second hall IC 62B and the index hall IC 62Z are integrated into a chip. However, they may be separately formed. When the magnetic flux density at the N-magnetic pole side that passes the hall IC becomes higher than a threshold value (e.g. a value between 0.9 milli-tesla (mT) and 5 milli-tesla (mT)), they generate the rotation signals (A-phase signal, B-phase signal and Z-phase signal). When the magnetic flux density at the S-magnetic pole side that passes the hall IC becomes higher than a threshold value (e.g. a value between 0.9 mT and 5 mT), they stop generating the rotation signals.

As shown in FIGS. 13A and 13B, the A-phase signal and the B-phase signal are generated at 90 degrees in electric angle (or 3.75 degrees in mechanical angle) different from each other. That is, one cycle of the A-phase signal and one cycle of the B-phase signal are generated each time the rotor 15 turns by 15 degrees. One cycle of the Z-phase signal is generated each time the rotor 15 turns by 45 degrees in mechanical angle. Therefore, the Z-phase signal defines the timing of supplying motor current and the relative positions of the rotor 15.

The circuit board 63, which supports the first and second hall ICs 62A, 62B and the index hall IC 62Z, is fixed to the rear end of the phase coils 22 and disposed inside the rear housing 20. Thus, the encoder 60 (61, 62) is mounted inside the rotary actuator 1, so that the rotary actuator 1 can be made compact.

An ECU 70 sets the rotation direction, the rotation speed and the rotation angle of the motor 5 according to a range shifting means (not shown) and controls the motor 5 to operate under the above-set conditions. In other words, the ECU 70 controls switching of current supply to one of the plurality of phase coils 22 from another according to the rotation angle that is detected by the encoder 60, when the motor 5 is operated, to carry out the synchronous operation of the motor 5, thereby controlling the shift range changing unit 3 via the speed reduction unit 6. As shown in FIG. 3, the ECU 70 is powered by a battery 71. Reference numeral 72 represents a display that indicates a current shift range and the operational state of the rotary actuator 1. The display may include a warning lamp or a buzzer. The ECU 70 connects to a power supply circuit 73, which supplies electric power to the motor 1. Reference numeral 74 is a speed sensor, and reference numeral 75 represents various sensors such as a gear position sensor and a break switch sensor.

Figure 14:
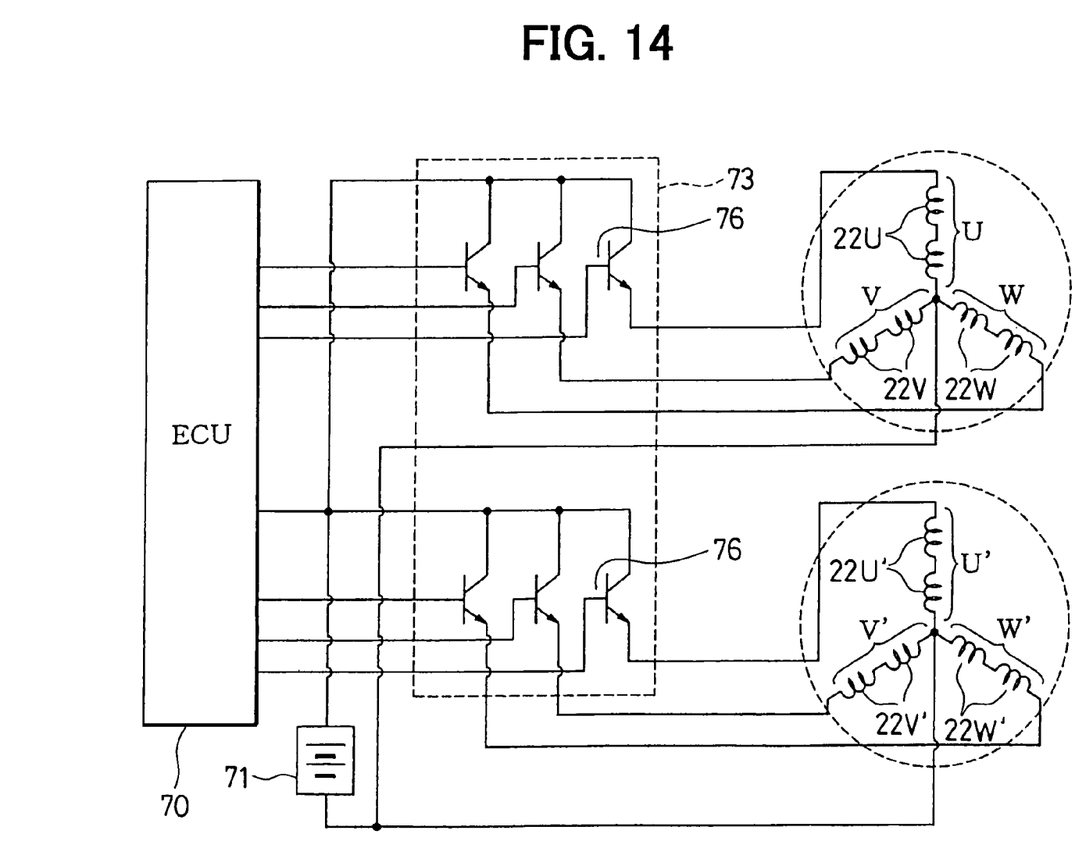
FIG. 14 is a circuit diagram of a power supply circuit of the motor.
Figure 15:
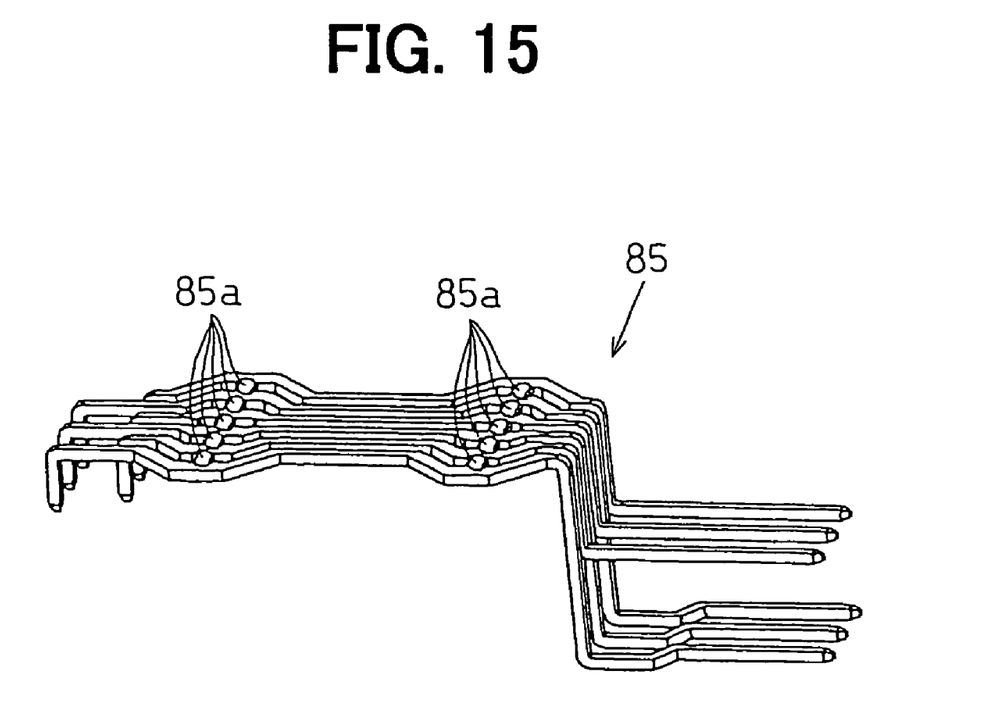
FIG. 15 is a perspective view of pre-finished sensor terminals.

As shown in FIG. 14, the power supply circuits 73 is connected between the ECU 70 and the phase coils 22 of the motor 5. The phase coils 22U, 22V and 22W are connected in the star arrangement, and the phase coils 22U', 22V' and 22W' are also connected in the star arrangement. The power supply circuit 73 includes six switching transistors 76 respectively connected to the phase coils 22.

Each phase coil 22 (22U, 22V, 22W, 22U', 22V' and 22W') is composed of a coiled insulated wire and a bobbin 81 made of insulation material. The bobbins 81 of the phase coils 22 are respectively fitted to the teeth 23 of the stator core 21 from outside. Each bobbin 81 has a pair of terminal holes (not shown) in which a pair of coil terminals 81a is inserted and a pair of grooves, in which opposite coil ends of the phase coils 22 are laid to be connected to the coil terminals 81a by means of fusion welding. During the fusion welding, the insulation coatings of the coils 22 at portions to be welded are automatically peeled off. Each coil terminal 81a has a shoulder and a projection at its rear end. The shoulder supports the circuit board 62 at a prescribed axial distance from the stator core 21, and the projection is connected to the circuit board 63, by means of soldering after it is inserted into a hole of the circuit board 63.

As shown in FIG. 1, the rear housing 20 supports a plurality of stator terminals 82, which is embedded in a resinous member 84 to connect the circuit board 63 with an external connector, which is to be connected to the power supply circuit 73. The resinous member 84 is further molded with resinous material 83 of the body of the rear housing 20. The stator terminals 82 are formed from a metal plate. The stator terminals 82 was connected to each other by bridging portions when they were formed from a metal plate. The bridged stator terminals 82 were separated by cutting the bridging portions after the bridged stator terminals 82 were embedded in a resinous member 84. This step can improve manufacturing works. The stator terminals 82 are grouped into two groups: the first terminal group for U, V and W phase coils and grounding; and the second terminal group for U', V' and W' phase coils and grounding (and for an auxiliary terminal, if necessary). Both terminal groups have the same shape. Therefore, the production cost of the stator terminals can be reduced.

A plurality (six) of sensor terminals 85 is also embedded in the resinous member 84 by means of insert molding. The sensor terminals 85 are formed from a metal terminal in the same manner as the stator terminals 82. The six sensor terminals 85 were separated from pre-separated sensor terminals shown in FIG. 15 by cutting bridging portions 85a when the bridged stator terminals 82 are separated after the pre-separated or bridged sensor terminals 85 are embedded into the resinous member 84.

The rear housing 20 is molded with the resinous member 84 and a metal ring 86 being together by means of insert molding. The metal ring 86 has an inner surface to which the stator core 21 is force-fitted and a boss portion to which the bearing 16 is force-fitted. Therefore, the rear housing 20 provides a sufficient strength for supporting the rotary actuator 1 as well as a compact size. The metal ring 86 is effective to prevent the axes of the rotor 11 and the stator 12 from shifting. Incidentally, the boss portion is machined with the outside or inside surface of the stator core being the basis for machining. This makes it possible to reduce the air gap distance between the rotor 11 and the stator 12, so that the output power of the motor 5 can be increased.

The circuit board 63 has a patterned circuit that connects the stator terminals 82 with the coil terminals 81a and also connects the sensor terminals 85 with the hall ICs 62. The circuit board 63 has a plurality of insertion holes 63a in which the coil terminals 81a and the sensor terminals 85 are inserted. The rear ends of the coil terminals 81a that extend from the bobbin 81 are inserted into certain insertion holes 63a of the circuit board 63 to connect the coil terminals 81a with a coil-current-supplying circuit of the patterned circuit by means of soldering or the like, as shown in FIG. 1B. The stator core 21 is force-fitted to the inner surface of the rear housing 20, which is the inner surface of the metal ring 86, as shown in FIG. 1A. At the same time, the stator terminals 82 and the sensor terminals 85 are respectively inserted into certain insertion holes 63a to connect them with the coil-current-supplying circuit by means of soldering or the like.

Thus, the coil terminals 81a are directly connected with the circuit board 63 on which the hall ICs 62 are mounted. Therefore, parts or components, which are disposed between the hall ICs 62 and the stator core 21, can be limited. That is, more accurate distance between the hall ICs 62 and the stator can be provided. The above structural arrangement improves assembling works of the rotary actuator and shortens the axial length thereof.

As a modification, the bobbins 81 and the circuit board 63 can be connected without the coil terminals 81a. The switched reluctance motor (SR motor) may be replaced by another motor such as a synchronous reluctance motor, or a synchronous motor having permanent magnets (SPM or IPM). The cycloid type speed reduction unit may be replaced by a planetary gear type speed reduction unit, or by a speed increasing unit. The rotary actuator may be replaced by a different type rotary actuator for changing the phase angle of a cam shaft.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A brushless synchronous motor comprising:
   a stator including a stator core having a plurality of stator teeth,
   a plurality of phase coils wound around said stator teeth;
   a rotor disposed opposite said stator;
   an encoder for detecting a rotation angle of said rotor, said encoder including a permanent magnet fixed to said rotor to rotate together, a magnetic sensor and a circuit board fixed to said stator;
   a power supply means for supplying electric power to said phase coils;
   a control means for controlling said power supply means to change power supply to one of said phase coils from another based on the rotation angle of said rotor;
   wherein:
   said circuit board includes a wiring circuit that connects said phase coils with said power supply means; and
   said magnetic sensor is directly fixed to said circuit board, further comprising a resinous member, a plurality of stator terminals that connect said wiring circuit with said power supply means and a plurality of sensor terminals that connects said magnetic sensor with said control means, wherein:
   said circuit board has a plurality of insertion holes in which said stator terminals are inserted to connect with said patterned circuit.

2. The brushless synchronous motor as claimed in claim 1, further comprising a plurality of bobbins each of which is mounted on one of said teeth to support one of said phase coils.

3. The brushless synchronous motor as claimed in claim 2, wherein each of said bobbins has a pair of coil terminals that electrically connects one of said phase coils to said wiring circuit.

4. The brushless synchronous motor as claimed in claim 1, wherein said sensor terminals and stator terminals are made of bridged metal plates whose bridged portions are cut after being formed into said resinous member.

5. The brushless synchronous motor as claimed in claim 1, further comprising a housing made of resinous material for supporting said stator and said rotor, wherein:
said stator includes a metal ring that has an inner surface supporting said stator and a center hole supporting said rotor.

6. The brushless synchronous motor as claimed in claim 1, wherein:
said plurality of phase coils is grouped into a first coil group and a second coil group;
said plurality of stator terminals is grouped into a first terminal group for connecting said first coil group and a second terminal group for connecting said second coil group; and
said first and second terminal groups have the same shape.

7. The brushless synchronous motor as claimed in claim 1, wherein:
said circuit board has a plurality of insertion holes in which said coil terminals are inserted to connect with said patterned circuit.

8. A brushless synchronous motor to be connected to a power circuit and a control circuit, said motor comprising:
a stator core having a plurality of stator teeth and a plurality of phase coils wound around bobbins that are fitted to said stator teeth;
a rotor disposed opposite said stator;
a housing for supporting said stator core and said rotor;
a circuit board having a patterned circuit that connects said phase coils in a prescribed circuit;
an encoder for detecting a rotation angle of said rotor, said encoder including a permanent magnet fixed to said rotor and a magnetic sensor fixed to said circuit board to be connected to said control circuit;
a power supply terminal disposed in said housing to be connected to said power supply circuit;
wherein:
said circuit board is fixed to said bobbins; and
said magnetic sensor is directly fixed to said circuit board,
wherein; each of said bobbins has a pair of coil terminals that has a shoulder supporting said circuit board at a prescribed axial distance from said stator core and a projection connected to said patterned circuit.

9. The brushless synchronous motor as claimed in claim 8, further comprising a plurality of stator terminals that connect said patterned circuit with said power supply means and a plurality of sensor terminals that connects said magnetic sensor with said control means.

10. The brushless synchronous motor as claimed in claim 9, wherein;
said housing is made of resinous material in which said stator terminals and sensor terminals are embedded.

* * * * *